United States Patent
Hruschka

(10) Patent No.: US 12,503,137 B2
(45) Date of Patent: Dec. 23, 2025

(54) METHOD FOR DETERMINING A TRAJECTORY OF AN AT LEAST PARTIALLY ASSISTED OPERATED MOTOR VEHICLE, COMPUTER PROGRAM AND ASSISTANCE SYSTEM

(71) Applicant: Volkswagen Aktiengesellschaft, Wolfsburg (DE)

(72) Inventor: Clemens Markus Hruschka, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 166 days.

(21) Appl. No.: 17/710,769

(22) Filed: Mar. 31, 2022

(65) Prior Publication Data

US 2022/0324484 A1    Oct. 13, 2022

(30) Foreign Application Priority Data

Apr. 1, 2021   (DE) .......................... 102021203353.9

(51) Int. Cl.
 *B60W 60/00*   (2020.01)
 *B60W 30/09*   (2012.01)
 (Continued)

(52) U.S. Cl.
 CPC ........ *B60W 60/0011* (2020.02); *B60W 30/09* (2013.01); *B60W 30/0956* (2013.01);
 (Continued)

(58) Field of Classification Search
 CPC ............. B60W 60/0011; B60W 30/09; B60W 30/0956; B60W 30/16; B60W 40/04;
 (Continued)

(56) References Cited

U.S. PATENT DOCUMENTS 11,958,477 B2 *   4/2024   Hoedt ................... B60W 40/04
2016/0288789 A1 * 10/2016   Durgin ................ B60W 30/143
(Continued)

FOREIGN PATENT DOCUMENTS

CN    111295317 A  *  6/2020  .......... B60W 30/095
CN    111750887 A    10/2020
(Continued)

OTHER PUBLICATIONS

C. M. Hruschka, D. Topfer and S. Zug, "Risk Assessment for Integral Safety in Automated Driving," 2019 2nd International Conference on Intelligent Autonomous Systems (ICoIAS), Singapore, 2019, pp. 102-109, doi: 10.1109/ICoIAS.2019.00025 (Year: 2019).*

(Continued)

*Primary Examiner* — Fadey S. Jabr
*Assistant Examiner* — Mark Robert Heim
(74) *Attorney, Agent, or Firm* — Peter Zura; LOZA & LOZA, LLP

(57) ABSTRACT

Technologies and techniques for determining a trajectory of an assisted-operated motor vehicle. At least one object is detected in an environment of the motor vehicle and at least one uncertainty with respect to the object is determined. A future environment with the object is predicted via an electronic computing device, as a function of the detected environment and the detected object, wherein a risk value for a planned trajectory is determined on the basis of a collision probability. A most probable impact constellation and accident severity for the most probable impact constellation is determined, wherein the collision probability and the accident severity is weighted in a risk value, and wherein the trajectory is determined as a function of the determined risk value.

20 Claims, 3 Drawing Sheets

(51) Int. Cl.
| | |
|---|---|
| *B60W 30/095* | (2012.01) |
| *B60W 30/16* | (2020.01) |
| *B60W 40/04* | (2006.01) |
| *B60W 50/00* | (2006.01) |

(52) U.S. Cl.
CPC ............ *B60W 30/16* (2013.01); *B60W 40/04* (2013.01); *B60W 50/0097* (2013.01); *B60W 60/0015* (2020.02); *B60W 60/00274* (2020.02); *B60W 2554/4041* (2020.02); *B60W 2554/80* (2020.02); *B60W 2720/106* (2013.01); *B60W 2720/125* (2013.01)

(58) Field of Classification Search
CPC ......... B60W 50/0097; B60W 60/0015; B60W 60/00274; B60W 2554/4041; B60W 2554/80; B60W 2720/106; B60W 2720/125; B60W 2556/20; B60W 30/0953; B60W 60/00272; B60W 30/085; B60W 40/107; B60W 40/109; B60W 2554/404; B60W 60/001; B60W 50/10; B60W 50/045; G08G 1/161; H04W 12/06; H04W 4/46; H04W 4/38
See application file for complete search history.

(56) References Cited

U.S. PATENT DOCUMENTS

| | | | | |
|---|---|---|---|---|
| 2017/0101093 | A1* | 4/2017 | Barfield, Jr. ........ | G08G 1/09675 |
| 2019/0171215 | A1* | 6/2019 | Tatourian ............... | G08G 1/166 |
| 2019/0232958 | A1* | 8/2019 | Deng ........................ | B60T 7/22 |
| 2020/0218267 | A1* | 7/2020 | Freienstein .......... | B62D 15/025 |
| 2020/0302783 | A1* | 9/2020 | Altendorfer .......... | G08G 1/166 |
| 2020/0326712 | A1* | 10/2020 | Tang .................... | G05D 1/0212 |
| 2021/0031763 | A1* | 2/2021 | Takaki .................. | G06V 20/58 |
| 2021/0108936 | A1* | 4/2021 | Seegmiller ......... | B60W 60/0011 |
| 2021/0204188 | A1* | 7/2021 | Oyama ................. | H04W 36/14 |
| 2022/0156576 | A1* | 5/2022 | Rasouli ................. | G06V 10/25 |
| 2022/0203971 | A1* | 6/2022 | Qin ................... | B60W 30/0956 |
| 2022/0223047 | A1* | 7/2022 | Pueschl ............... | G08G 1/0133 |
| 2022/0297682 | A1* | 9/2022 | Javaid ................. | B60W 30/09 |
| 2024/0034316 | A1* | 2/2024 | Deschamps ........... | B60W 30/14 |

FOREIGN PATENT DOCUMENTS

| | | | | |
|---|---|---|---|---|
| DE | 102014005924 A1 | | 11/2014 | |
| DE | 102015121353 A1 | * | 6/2017 | .......... B60W 10/184 |
| DE | 102016218080 B3 | | 8/2017 | |
| DE | 102017204393 A1 | * | 9/2018 | |
| DE | 102017114876 A1 | * | 1/2019 | |
| DE | 102018005236 A1 | | 1/2019 | |
| DE | 102018211513 A1 | * | 1/2020 | |
| EP | 3291202 A1 | | 3/2018 | |
| JP | 2016005294 A | | 1/2016 | |
| WO | 2009049814 A1 | | 4/2009 | |
| WO | WO-2021051959 A1 | * | 3/2021 | ............ B60W 30/08 |

OTHER PUBLICATIONS

DE102017204393A1 machine translation (Year: 2018).*
DE102018211513A1 machine translation (Year: 2020).*
DE102017114876A1 machine translation (Year: 2019).*
Kuehbeck et al., Evaluation of Performance Enhancement for Crash Constellation Prediction via Car-to-Car Communication, Springer International Publishing (Year: 2014).*
Muller et al. Machine Learning Based Prediction of Crash Severity Distributions for Mitigation Strategies, Journal of Advances in Information Technology vol. 9 (Year: 2018).*
DE-102015121353-A1 machine translation (Year: 2017).*
WO 2021051959 A1 (Year: 2021).*
CN-111295317-A machine translation (Year: 2020).*
DE Application No. 102021203353.9. Examination Report (Aug. 3, 2021).
Themann et al. "Impact of Positioning Uncertainty of Vulnerable Road Users on Risk Minimization in Collision Avoidance Systems". 2015 IEEE Intelligent Vehicles Symposium (IV), Coex, Seoul, Korea, pp. 1201-1206 (Jun. 28-Jul. 1, 2015).
Hruschka. "Risk assessment for integral safety in operational motion planning of automated driving". Technische Universitat Bergakademie Freiberg. Thesis, 188 pp. (Sep. 1, 2021).
Corresponding European Application No. 22165282.9. Examination Report (Jul. 18, 2024).
Hruschka et al. "Risk assessment for integral safety in automated driving." 2nd Int'l Conference on Intelligent Autonomous systems (ICoIAS), pp. 102-109 (2019).

* cited by examiner

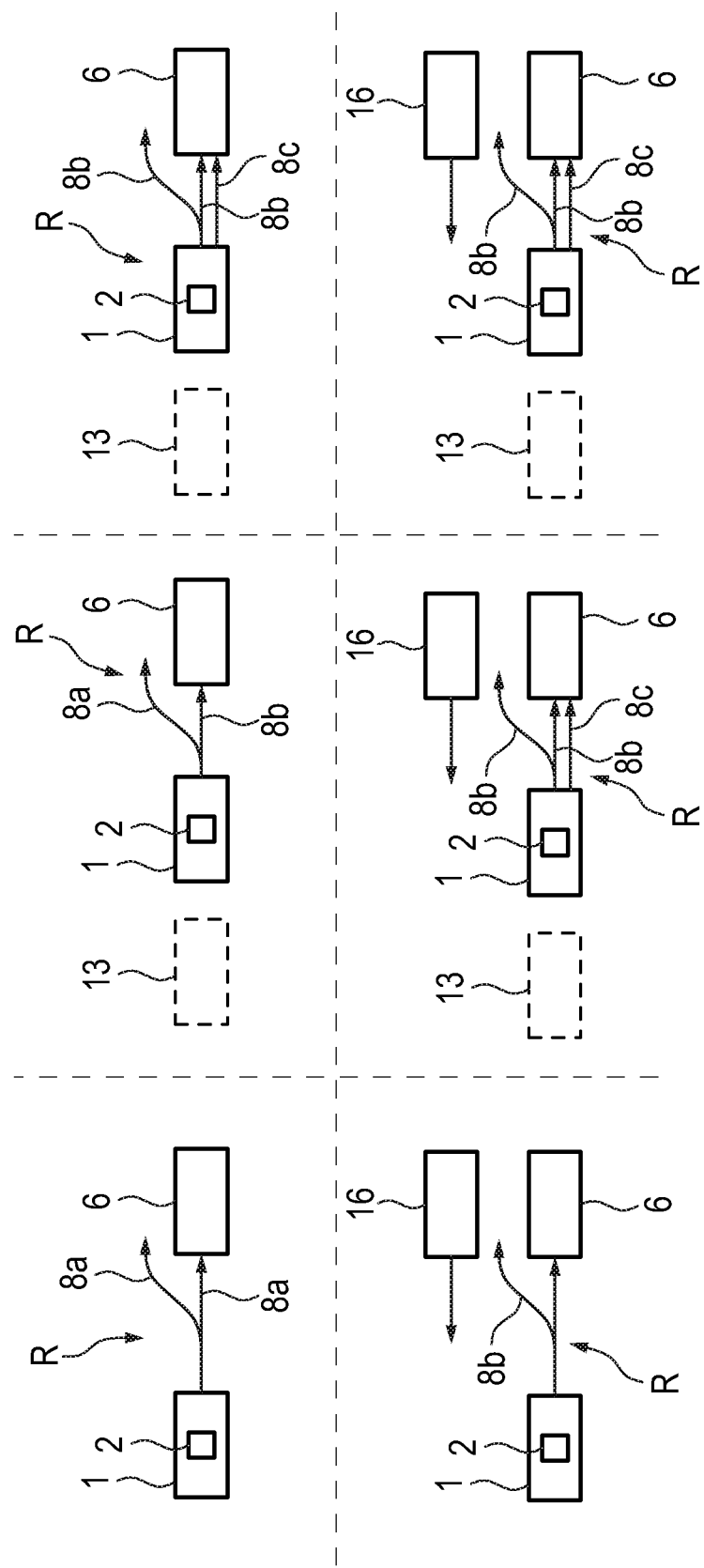

METHOD FOR DETERMINING A TRAJECTORY OF AN AT LEAST PARTIALLY ASSISTED OPERATED MOTOR VEHICLE, COMPUTER PROGRAM AND ASSISTANCE SYSTEM

RELATED APPLICATIONS

The present application claims priority to German Patent App. No. 10 2021 203 353.9, to Clemens Markus Hruschka, filed on Apr. 1, 2021, titled "Method For Determining A Trajectory Of An At Least Partially Assisted Operated Motor Vehicle, Computer Program and Assistance System," the contents of which is incorporated by reference in its entirety herein.

TECHNICAL FIELD

The present disclosure relates to technologies and techniques for determining a trajectory of an at least partially assisted-operated motor vehicle by means of an assistance system of the motor vehicle. The present disclosure further relates to a computer program product and an assistance system.

BACKGROUND

In the case of at least partially assisted-operated vehicles, or in the case of automated-operated vehicles, corresponding behavior planning, including driving trajectories, is typically determined. The goal here is to avoid accidents or collisions for the safety and protection of the traffic participants involved or, if this is not possible, to at least reduce the severity of the accident. For this reason, the environment is, for example, perceived by means of integrated vehicle sensors and, for example, a vehicle-to-infrastructure communication and, in automated driving, the behavior of other traffic participants is then estimated by means of an object prediction and, in assisted driving, the driving behavior of the own vehicle is additionally also estimated and an own driving trajectory is planned on the basis of this knowledge.

A major challenge here is that perception and prediction results are subject to uncertainty due to the sensory detection of the vehicle environment and the unknown intention of other traffic participants. In particular, there is the challenge of making an informed decision between collision avoidance and collision mitigation maneuvers in critical situations. The collision avoidance maneuver has the potential to prevent the accident altogether. However, if the avoidance maneuver fails, this could lead to increased accident severity compared to a priori mitigation maneuver, which would thus be the maneuver of choice. In general, the safety system with combined steering and braking interventions is assumed. Furthermore, settings for restraint systems, for example, a belt tightening prior to collision, can also be taken into account in a maneuver selection.

Accident constellations that arise due to different driving trajectories can be differentiated using a suitable accident severity metric. A collision-free maneuver would be classified with, for example, an accident severity of S=0, which ultimately makes it possible to rate and compare all alternative actions, such as possible maneuvers and select the optimal trajectory. However, the aforementioned uncertainties make it difficult to determine this accident severity. Therefore, it is possible to determine the expected value regarding the accident severity with the help of the probability theory. In the present disclosure, this is also referred to as "risk", which, according to a standardized definition, weighs the potential amount of damage with the probability of occurrence of this damage. Moreover, the application described above places requirements on the accident severity metric and its determination. The point of impact, translational and rotational dynamics as well as relevant static parameters have to be considered in order to select an appropriate driving behavior.

In the state of the art, determining the risk of trajectories, for example via so-called Monte Carlo simulations, is very computationally intensive, since often no closed-form solutions exist for these problems. This is especially the case when common methods for object tracking, such as the extended Kalman filter, describe object states that are subject to uncertainty as normal. However, since trajectory planning in a dynamic environment is subject to real-time requirements, suitable computational methods must be found that provide a required quality in an acceptable computation time.

In this regard, the publication by J. Hardy and M. Campbell, "Contingency Planning over Probabilistic Obstacle Predictions for Autonomous Road Vehicles," in: IEEE Transactions on Robotics (2013) represents the prior art.

Furthermore, DE 10 2016 218 080 B3 relates to a device and a method for determining a collision probability of a vehicle with an object, comprising the following steps: detecting a vehicle pose and an object pose; calculating the collision probability by means of a calculation device, wherein the following steps are carried out: A) determining a combined probability distribution from the vehicle pose and the object pose; B) calculating a common collision surface based on a vehicle surface of the vehicle and an object surface of the object; C) transforming the common collision surface based on the combined probability distribution; D) determining an integral of a probability density function over the transformed collision surface to calculate the collision probability, wherein to determine the integral values are retrieved and provided from a look-up table provided by a memory; and wherein the probability density function is a probability density function of a bivariate standard normal distribution, and outputting the calculated collision probability as a collision probability signal by means of an output device.

SUMMARY

Aspects of the present disclosure are directed to providing technologies and techniques of which an assistance system may determine a trajectory for an at least partially assisted-operated motor vehicle in an improved manner.

Various aspects are described in the features of the independent claims, found below. Further embodiments are recited in the dependent claims.

One aspect of the present disclosure relates to a method for determining a trajectory of an at least partially assisted-operated motor vehicle via an assistance system of the motor vehicle, in which at least one object in an environment of the motor vehicle is detected by via an environment detection device of the assistance system. An uncertainty with respect to the object is determined via an electronic computing device of the assistance system, wherein a future environment with the object is predicted via the electronic computing device as a function of the detected environment and the detected object. A risk value for a planned trajectory is determined on the basis of a collision probability. The collision probability is determined via the electronic computing device, and a determined most probable impact constellation and a determined accident severity for the most probable impact constellation. The collision probability and the accident severity are weighted in the risk value, and wherein the trajectory is determined as a function of the determined risk value.

In such configurations, the trajectory can be determined in an improved manner. In particular, collision avoidance or collision mitigation can thus be weighed under the determined uncertainties and, for example, an evasive maneuver can be performed or a point of impact can be identified based on steering and braking. In other words, trajectory planning takes place that may work equally for evasive and mitigation maneuvers, and thus makes it possible to weigh between them. Uncertainties are explicitly modeled and taken into account, so that the selection is based on the risk of the possible trajectories without, for example, making or setting a preselection/precondition regarding avoiding or mitigating. In some examples, a risk may be used on an instantaneous level, including the division into collision probability and severity in the trajectory planning.

Accordingly, a robust distinction may be enabled between avoidance and mitigation under uncertainties in the trajectory planning. For example, an emergency trajectory can be determined as trajectory. Combined steering and braking maneuvers are taken into account here. Ultimately, road safety can be increased as a result. Furthermore, statistical point of impact identification, and thus the increase of safety in road traffic, can be enabled. The low computation time makes it possible to determine a large number of trajectories in the behavior planning for the motor vehicle, for example, automated trajectory planning, or in the monitoring of the driver in assisted driving under real-time conditions, and thus to compare options for action. Furthermore, this is an efficient solution which is significantly faster than Monte Carlo based methods with comparable accuracy. In particular, the presently disclosed configurations exhibit high accuracy and, at the same time, fast computation, even without using a Monte Carlo simulation or a numerical integration method, for example. In particular, it is in fact a deterministic method, as opposed to a Monte Carlo simulation. Thus, the computation time can be estimated and said computation time is independent of the sample number or the discretization steps.

In some examples, the environment may be detected via the environment detection device, whereby, object poses and their uncertainties with respect to the object can be determined. Furthermore, uncertainties concerning the motor vehicle are also taken into account. The environment is projected into the future and a safe trajectory is planned on the basis of this information. The risk may be determined, wherein the risk is determined as a function of a collision probability and a most probable impact constellation. Furthermore, the accident severity for the most probable impact constellation is determined precisely and the collision probability and severity are weighted accordingly. The trajectory planning is then performed based on the risk. For example, an emergency maneuver can then be performed in critical situations, wherein said emergency maneuver is performed based on a robust decision, based on probability theory, between evasion and mitigation under uncertainties in critical situations to ultimately perform combined steering and braking interventions to increase road safety. Subsequently, the motor vehicle can perform the determined emergency maneuver. Additionally, a readjustment can then be realized, in which the procedure is again started from the beginning.

Such configuration can be applied to a vehicle in two-dimensional road traffic as well as to configurations in a three-dimensional space, for example, for aircraft or the like, to the extent that this is useful for an accident severity. In some examples, the present disclosure is intended to be used for the trajectory. However, it is also possible to use the presented criticality metric based on risk in regular driving. Aspects of the present disclosure can be used in automated driving as well as in assisted driving. If the risk of a trajectory can be continuously estimated and minimized in automated driving, an intervention based on the risk value is additionally possible in assisted driving.

The object can be a static object, but also a dynamic object.

In some examples, an evasive maneuver with respect to the object or a mitigation maneuver with respect to the object, may be determined as the trajectory. An accident is prevented, in particular, with an evasive maneuver. In other words, an accident does not occur. The mitigation maneuver may provide that, although a contact or collision is envisaged, it is mitigated in contrast to the accident that was actually determined. In other words, steering or braking can be performed in such a way that the collision is mitigated, for example, so that a collision is less severe than previously determined.

Furthermore, it has been shown to be advantageous if, during the trajectory, at least partially assisted intervention is made in a longitudinal acceleration device and/or a lateral acceleration device of the motor vehicle. In particular, the motor vehicle can thus be steered as well as braked. Alternatively, the motor vehicle can also be accelerated. In particular, the movement of the motor vehicle can thus be adapted accordingly to perform the evasive maneuver or the mitigation maneuver, for example.

Furthermore, it has been shown to be advantageous if a position uncertainty of the object and/or the position uncertainty of the motor vehicle and/or a pose uncertainty of the object and/or a pose uncertainty of the motor vehicle are determined as uncertainty. Furthermore, parameter uncertainties concerning the object and the motor vehicle, for example, concerning the dimension of the vehicle contour, may also be taken into account. In particular, the information determined via the environment detection device is subject to uncertainties. For example, the determining position of the object is subject to a corresponding uncertainty. Furthermore, the motor vehicle's own position may also be subject to a corresponding uncertainty. In addition, the determined pose of the object and the motor vehicle may be subject to a corresponding uncertainty. This uncertainty is now taken into account in the trajectory planning.

It may also be advantageous if the determination of the risk value is performed on an instantaneous level for the future environment. In other words, the risk value is determined for several points in time in the future. In particular, the risk is then determined at each instantaneous time and for each corresponding trajectory. Thus, a fully comprehensive risk assessment can be performed.

In some examples, determining the trajectory, and/or determining the risk value, may be performed in real time. Such a configuration can be applied while the motor vehicle is being driven. This can thus be carried out in real time, whereby the process can be used for daily operation in the motor vehicle. Due to the low computing capacity, especially compared to a so-called Monte Carlo simulation, for example, the method can be used reliably, whereby road safety can be improved in real time. The real-time capability may be ensured, in particular, by approximations at the appropriate point. On the one hand, the calculation of the collision probability is based on the Minkowski difference.

On the other hand, a representative impact constellation, which may correspond to the most probable impact constellation, may be extracted in order to efficiently enable the accident severity calculation on the basis thereof.

In some examples, determining the most probable impact constellation may be carried out based on a Minkowski difference and a linear transformation. In particular, the Minkowski difference and the linear transformation is a computational capacity-saving option to determine the most probable impact constellation. In particular, appropriate approximations take place so that the most probable impact constellation can be determined in real time. Thus, the trajectory can be determined in an improved manner, which can increase safety in road traffic. In particular, the procedure for determining the most probable impact constellation is thus carried out via the Minkowski difference and via linear transformation. In particular, the calculation of the complex accident severity requires an appropriate modeling of the input variables. The impact constellation is of great importance for the accident severity. The method according to the present disclosure explicitly describes which instantaneous accident constellations occur with which probability in order to thus determine an accident severity in a targeted or efficient manner A complex accident severity enables a certain differentiation of impact situations, in particular, in the statistical sense, in order to thus increase the safety of traffic participants. In particular, the most probable impact constellation is thus determined with respect to the probability for impact constellation ranges in order to determine representative elements for the severity.

It may also be advantageous that a distribution of the accident severity is considered during the determining of the risk value. In particular, if the most probable impact constellation is not sufficient for the accident severity, a distribution of the accident severity can also be specified, this being determined, for example, via a Gaussian uncertainty propagation, and thus taking into account confidence intervals, whereby the accident severity can be determined.

The method presented is, in particular, a computer-implemented method. Thus, a further aspect of the present disclosure relates to a computer program comprising program code means which cause an electronic computing device, when the program code means is processed thereby, to perform a method according to the preceding aspect. Therefore, the present disclosure also relates to a computer readable storage medium comprising a corresponding computer program product.

A still further aspect of the present disclosure relates to an assistance system for an at least partially assisted-operated motor vehicle for determining a trajectory, at least one environment detection device comprising an electronic computing device, the assistance system being adapted to perform a method according to the preceding aspect. In particular, the method may be performed by means of the assistance system.

In some examples, the electronic computing device includes electrical components, such as integrated circuits, processors and further electronic components, in order to be able to carry out a corresponding method.

A yet further aspect of the present disclosure relates to a motor vehicle comprising an assistance system according to the preceding aspect. In particular, the motor vehicle is operated in an at least partially assisted manner Preferably, the motor vehicle is operated in a fully automated manner.

The present disclosure also includes further embodiments of the assistance system according to the present disclosure and the motor vehicle according to the present disclosure having features as described already in connection with the further embodiments of the method according to the present disclosure. For this reason, the corresponding further embodiments of the assistance system according to the present disclosure and the motor vehicle according to the present disclosure are not described here again.

The present disclosure also includes the combination of the features of the embodiments described.

BRIEF DESCRIPTION OF THE DRAWINGS

In the following, various aspects of the present disclosure are described. In the figures:

FIG. 4 a schematic top plan view of a further traffic situation according to some aspects of the present disclosure.

DETAILED DESCRIPTION

The embodiments described below are preferred embodiments of the present disclosure. In the embodiments, the components described each represent individual features of the present disclosure which are to be considered independently of one another and which each also further the present disclosure independently of one another and thus are also to be regarded as a component of the present disclosure individually or in a combination other than that shown. Furthermore, the described embodiments can also be expanded by further ones of the already described features of the present disclosure.

In the figures, functionally identical elements are each provided with the same reference signs.

Figure 1:
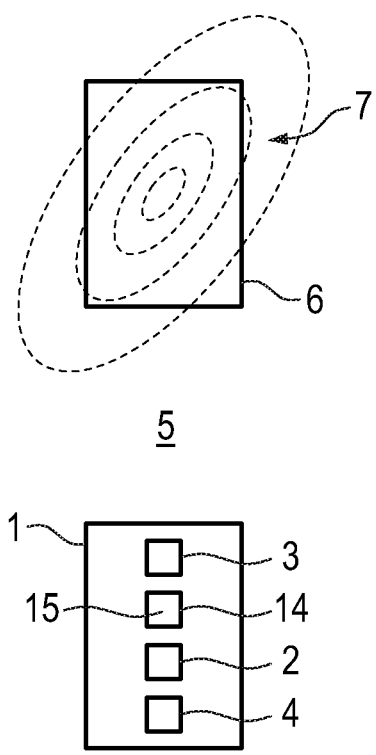
FIG. 1 a schematic top plan view of a motor vehicle including an assistance system according to some aspects of the present disclosure.

FIG. 1 shows a schematic top plan view of a motor vehicle 1 including an assistance system 2 according to some aspects of the present disclosure. In this example, the motor vehicle 1 is at least partially assisted-operated. In particular, the assistance system 2 can thus intervene, for example, in a lateral control or in a longitudinal control of the motor vehicle 1. The motor vehicle 1 may also be fully automated. The assistance system 2 has at least one environment detection device 3 and an electronic computing device 4. An environment 5 and a further object 6, in this case a further motor vehicle, can be detected by means of the environment detection device 3. In particular, the object pose of the object 6 can be detected. While detecting the further motor vehicle, in particular, an uncertainty 7 may occur. This uncertainty 7 is, in particular, a pose uncertainty of the further motor vehicle or a position uncertainty of the further motor vehicle, for example. The motor vehicle 1 may also have a position uncertainty and a pose uncertainty. Furthermore, a parameter uncertainty, for example, regarding the dimension of the contour of the object 6 or of the motor vehicle 1, can also be taken into account.

Figure 2:
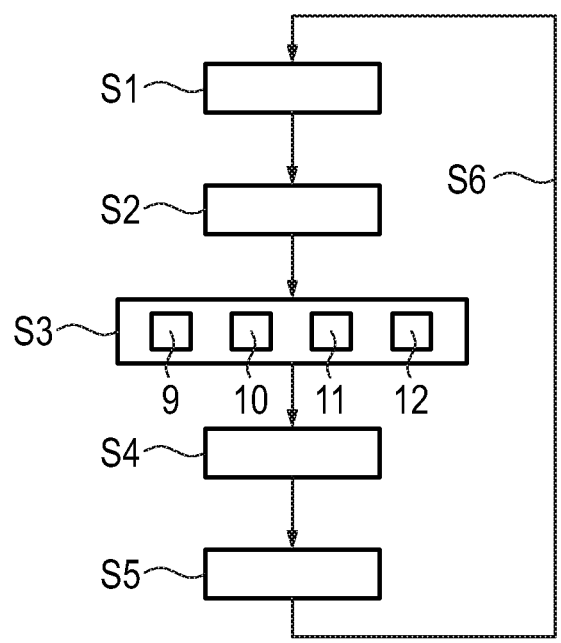
FIG. 2 a schematic flow diagram according to some aspects of the present disclosure.

FIG. 2 shows a schematic flow diagram according to according to some aspects of the present disclosure. In this example, it is shown that by means of the assistance system 2 a trajectory 8 (FIG. 3) of the at least partially assisted motor vehicle 1 can be determined. For this purpose, in a first step S1 at least the object 6 in the environment 5 of the motor vehicle 1 is detected by means of the environment detection device 3 and the uncertainty 7 with respect to the object 6 is determined by means of the electronic computing device 4 of the assistance system 2. A future environment 5 with the object 6 is predicted as a function of the detected environment 5 and the detected object 6 in a second step S2 by means of the electronic computing device 4. In a third step S3, a risk value R (FIG. 3) for a planned trajectory 8a, 8b, 8c (FIG. 4) is determined on the basis of a collision probability 9 determined by means of the electronic computing device 4 and a determined most probable impact constellation 10 and a determined accident severity 11 for the most probable impact constellation 10, wherein the collision probability 9 and the accident severity 11 are weighted in the risk value R on the basis of a weight 12, and wherein the trajectory 8 is determined as a function of the determined risk value R. The determination of the trajectory 8 is shown in the present case in particular by the fourth step S4. In a fifth step S5, in turn, the determined emergency maneuver, i.e. the trajectory 8, can then be performed. Then, in a sixth step S6, a readjustment can be carried out, in which it is possible to go back to the first step S1, whereby a continuous optimization of the vehicle action can be realized.

It may, in particular, be provided that an avoidance maneuver 8a (FIG. 4) with respect to the object 6 or a mitigation maneuver 8c (FIG. 4) with respect to the object 6 is determined as the trajectory 8. Furthermore, regarding the trajectory 8, an at least partially assisted intervention in a longitudinal acceleration device 14 and/or a lateral acceleration device 15 of the motor vehicle 1 is possible.

As mentioned above, a position uncertainty of the object 6 and/or a position uncertainty of the motor vehicle 1 can be determined as the uncertainty 7. Furthermore, a pose uncertainty of the object 6 and a pose uncertainty of the motor vehicle 1 can also be determined. Furthermore, the parameter uncertainty can also be determined.

It is provided herein that determining the trajectory 8, in particular, determining the risk value R, is carried out in real time.

Figure 3:
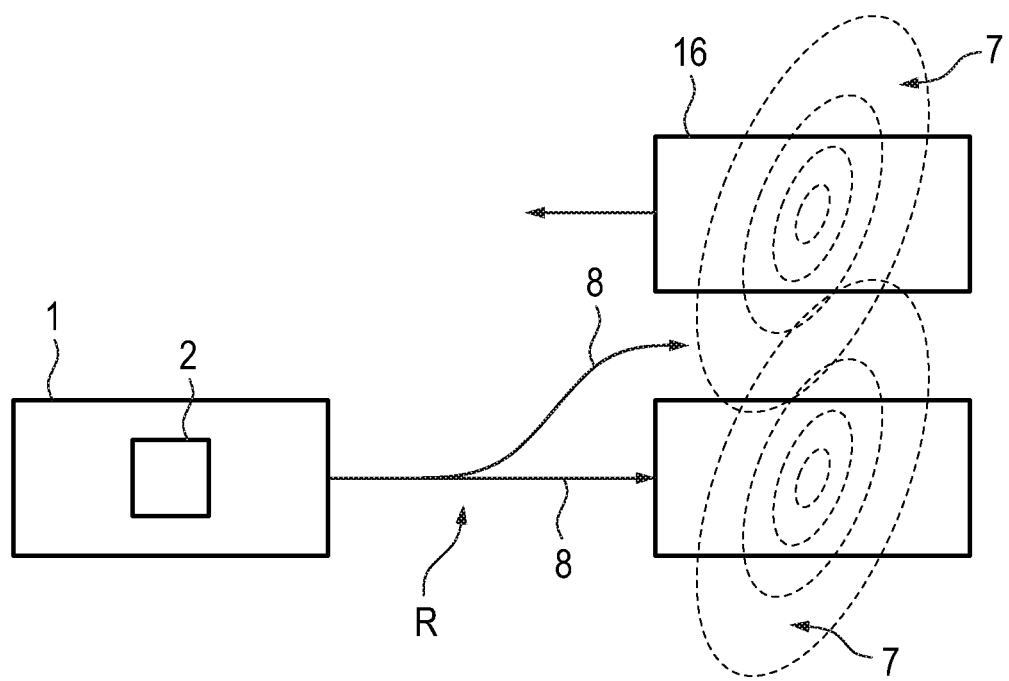
FIG. 3 a schematic top plan view of a first traffic situation according to some aspects of the present disclosure.

In the example of FIG. 3 a first traffic situation of the motor vehicle 1 is described. The motor vehicle 1 drives straight ahead and "suddenly" the object 6 appears as a further motor vehicle, for example, due to a parking maneuver of the further motor vehicle or due to the further motor vehicle taking the right of way, as well as a further object 16 as once again a further motor vehicle and as oncoming traffic. The one further motor vehicle remains in the same lane as the motor vehicle 1 and thus impedes continued driving. In this case, the last point for braking with collision avoidance has already been exceeded for motor vehicle 1. Nevertheless, the collision with the object 6 could be avoided by taking evasive action. In this embodiment example, oncoming traffic hinders an unobscured or safe evasive maneuver 8a. For an appropriate simulation of such a traffic situation, a test drive can be repeated with changing but predefined uncertainty level with respect to the occurring objects 6, 16.

The scenario requires selecting between two unfavorable options. On the one hand, braking would mitigate the collision with object 6 but also cause a certain accident, thus forming a mitigation maneuver 8c. On the other hand, the evasive maneuver offers the chance of collision avoidance with both objects 6, 16, but if it fails, the collision occurs with even higher severity because of the high relative speed with respect to the oncoming traffic. In other words, if it is possible to predict a safe avoidance maneuver 8a, it is preferred to collision mitigation. Conversely, if collision avoidance is not possible, mitigation is preferred. The decision depends on the potential accident severity 11 and its uncertainty 7 the risk value R. In other words, a low uncertainty 7 allows an informed decision for the avoidance maneuver 8a. However, if the uncertainty 7 is too high, collision mitigation is chosen.

In the following, the existence and classification uncertainties are considered the most probable. In other words, an object 6 either exists or does not exist, and in the case of existence, only one object class is assigned. Therefore, an equation to determine the risk value simplifies to:

$$R(\pi) = \underbrace{\sum_{i=1}^{N_{inst}} \sum_{k=1}^{N_O} \sum_{j=1}^{N_H} p(h_k^j) \cdot R(EK_{i,k}^j)}_{:=R_{f,t_i}} \quad (1)$$

Moreover, the uncertainties of length $l_{E,k}$ and width $w_{E,k}$ are neglected. With respect to object 6, this is based on the assumption that the geometric impact is superimposed on the object pose. The ego vehicle length $l_E$ and width $w_E$ are assumed to be known based on design information independent of the planning process.

The accident severity 11 of a partial state is modeled as a random variable with a sample space specifying all possible object constellations between the ego-vehicle and a target object (accident-free, accident constellation, etc.) with the probability and probability density function. Accordingly, the expected value R can be calculated with:

$$R(EK) = E(\Psi) = \int_{\Omega^{voc}} \Psi(\omega) \cdot dP(\omega) \stackrel{discretisation}{\Rightarrow} E(\Psi) \sum_n \psi_n \cdot p_n \quad (2)$$

$$= \int_{\omega \in \Omega^{voc}} \psi(\omega) p_\Omega^{VOC}(\omega) d\omega$$

In this way, the severity level of incremental damage Y(w) and their incremental probabilities of occurrence dP(w) are combined, namely the incremental risk dR, which in turn is aggregated to the risk R(EK) of the partial state. The severity level Y is determined according to the predictive models h with the input vector according to the environmental model. Accordingly, the risk R(EK) is determined with the joint probability density function, while the geometric state of the motor vehicle 1 and the object 6, and a parameter vector can be modeled in a mutually stochastically independent manner $$R(EK) = E(\Psi) = \quad (3)$$

$$\int_{\tilde{g}_E} \int_{\tilde{g}_K} \int_{p_E} \int_{p_K} \eta(z) p_{X_E, Y_E, \Phi_E}(x_E, y_E, \varphi_E) p_{X_K, Y_K, \Phi_K}(x_K, y_K, \varphi_K) \cdot$$

$$p_{p_E}(p_E) p_{p_K}(p_K) d\tilde{g}_E d\tilde{g}_K dp_E dp_K$$

Assuming cooperative behavior between average traffic participants, the independence between motor vehicle 1 and object 6 overestimates the risk R(EK) and is therefore a conservative approximation. However, due to the normal distributions of Z, there is no analytical solution. In addition, random calculations or numerical integrations are not suitable due to the computation time requirements. Therefore, the following section deals with suitable approximations to the equation shown above.

A severity level Y>0 occurs only when an accident occurs. Therefore, the equation is separated into the geometric variables related to the probability of an accident (I) and damage (II):

$$2R(EK) = E(\Psi) = \int_{\tilde{g}_E} \int_{\tilde{g}_K} \eta_{ind}(z) p_{X_E,Y_E,\Phi_E}(x_E, y_E, \varphi_E) \quad \text{(I)(4)}$$

$$p_{X_K,Y_K,\Phi_K}(x_K, y_K, \varphi_K) \cdot \left[ \int_{\tilde{g}_E|coll} \int_{\tilde{g}_K|coll} \int_{p_E} \int_{p_K} \eta(z) \cdot \right.$$

$$p_{\tilde{G}_E|coll}(\tilde{g}_E \mid coll) p_{\tilde{G}_K|coll}(\tilde{g}_K \mid coll) \cdot p_{P_E}(p_E) \quad \text{(II)}$$

$$\left. p_{P_K}(p_K) d\tilde{g}_E d\tilde{g}_K dp_E dp_K \right] d\tilde{g}_E d\tilde{g}_K$$

$$\eta_{ind}(z) = \begin{cases} 1 & \vartheta(x_E, y_E, \varphi_E, l_E, w_E,) \wedge \vartheta(x_K, y_K, \varphi_K, l_K, w_K) \neq \emptyset \\ 0 & \vartheta(x_E, y_E, \varphi_E, l_E, w_E,) \wedge \vartheta(x_K, y_K, \varphi_K, l_K, w_K) = \emptyset \end{cases} \quad (5)$$

This function reports a collision when the vehicle contour regions J overlap, depending on the geometric states.

To distinguish different collision configurations, the second part II) of the above equation indicates the accident severity 11 for each accident constellation. Again, due to modeling with normal distributions, there is no closed-form solution. Moreover, the severity prediction model h(Z) is nonlinear and deforms the shape of the normal distribution. On the one hand, the integral II) could be solved by permutation over the collision configurations with y>0. As a result, the equation changes to:

$$R(EK) = E(\Psi) = \underbrace{P(C)}_{I)} \cdot \underbrace{\sum_{n=1}^{N_{coll.const.}} P(z_n \mid coll) \cdot \eta(z_n)}_{II)} \quad (6)$$

The accuracy here depends directly on the discretization. Theoretically, with an infinitely small step size and infinitely many collision constellations, respectively, the expected values of the severity E(Y) and thus the risk R(EK) can be calculated exactly. However, even smaller numbers require a high computation time, which is not suitable for real-time applications. Alternatively, uncertainty propagation through the severity level model h provides a distribution of the severity level independent of arbitrary discretizations. Moreover, it allows for the evaluation of different quantiles yp-quantile of the severity level in addition to the expected value.

This approximation could be used for additional margins of safety. Since sample-based approaches are not suitable for real-time applications, the shape of a normal distribution requires linear uncertainty propagation to avoid deforming the distribution:

$$\Psi_{coll} = \eta(Z \mid coll) \overset{linearisation}{\Rightarrow} \Psi_{coll} \sim \mathcal{N}(\mu_\Psi, \Sigma_\Psi) \text{ with} \quad (7)$$

$$\mu_\Psi = \eta(\mu_{Z|coll})$$

$$\Sigma_\Psi = \nabla \eta \mid_{\mu_{Z|coll}} \Sigma_Z \nabla \eta^T \mid_{\mu_{Z|coll}}$$

Here, ∇(h) indicates the Jacobi matrix of the severity level prediction model evaluated at the point mZ.

The main objective is to estimate the risk R and the expected value, respectively. Thus, the equation (4) changes to:

$$R(EK) = E(\Psi) = \underbrace{P(C)}_{I)} \cdot \underbrace{E(\Psi_{coll})}_{II)} \quad (8)$$

Assuming symmetric, flattening input distributions, such as with normal distribution, the expected value is equal to the severity level of the most probable collision configuration. This leads to the risk estimate:

$$R(EK) = E(\Psi) = \underbrace{P(C)}_{I)} \cdot \underbrace{\psi_{P_{max}}}_{II)} \quad (9)$$

In summary, the risk assessment stated above is used for each instantaneous partial state zEK present in the assessment. However, this serves only to simplify the concept according to the present disclosure and is by no means to be regarded as conclusive. Other risk assessments presented may also be used.

The separation into collision probability 9 and accident severity 11 provides for the separation between preventive driving and emergency maneuvers. For regular driving, accident severity 11 is less important compared to collision probability 9. Here, collision probability 9 ensures safe driving. In contrast, severity distinguishes different collision configurations in emergency driving maneuvers.

Furthermore, a short distance to the possible collision results in a high resolution of a Markov's decision process regarding the collision configurations. The most probable accident configuration determines the accident severity 11. Here an assumption is made about the shape of the distribution. The input shape must be symmetrically flattening to be valid for exact calculations. Otherwise, it is a slight approximation compared to the inaccuracies of the severity prediction model, which allows real-time applications due to the smaller number of calculations. The normal distributions of the inputs represent a special case of a symmetrically flattening distribution. In addition, the most probable geometric collision configuration is derived using mechanisms similar to those used in the calculation of the collision probability 9, and thus with low computational effort. All other input parameters for determining the accident severity are not conditional and can thus be derived directly from the respective distributions.

The separation into collision probability 9 according to I) and accident severity 11 according to II) also allows for the use of established nonlinear methods for efficient estimation of collision probability 9. Furthermore, the severity distribution could be derived by Gaussian uncertainty propagation. As a result, detailed safety requirements can be set and are thus open for future standards.

According to the bivariate collision probability 9 method, the most probable geometric collision configuration can be directly identified. The equipotentials of the standardized normal distribution are concentric circles around the point of origin. Therefore, the shortest distance to the collision area, which is described herein terms of a Minkowski difference, indicates the most probable geometric collision configuration. It is either a vertex directly or a point between the two shortest vertices. The Minkwoski difference can be further subdivided into subranges representing collision configurations that permute the geometric features of the gravity prediction model h. Finally, the mapping correlates with the untransformed collision domain due to the linear relationship and thus the input for gravity prediction is obtained.

The example of FIG. 4 shows a further traffic scenario according to some aspects of the present disclosure. This scenario is used to describe the mitigation performance of the risk-based planner. FIG. 4 describes that the motor vehicle 1 is driving straight ahead, when "suddenly" a potential collision object, in this case the object 6, appears. This can, for example, occur when object 6 exits a parking space. Consequently, motor vehicle 1 must perform an emergency maneuver. Depending on the object distance, different options are available. The underlying speeds cause the last point to brake to be passed before the last point to steer for accident avoidance. If the distance is great enough, the motor vehicle 1 is free to choose an appropriate evasive maneuver 8a to avoid a collision based on the risk assessment. If the distance decreases, a collision can only be avoided by steering. If the object 6 appears very suddenly, avoidance is no longer possible, but a mitigation maneuver 8c can still reduce impact severity. Furthermore, motor vehicle 1, which has already "moved on", is provided with the reference sign 13 in FIG. 4. Reference sign 8b indicates in particular the collision trajectory or the collision maneuver without corresponding intervention by the assistance system.

Furthermore, FIG. 4 shows a modification of the scenario presented above. Here, two objects 6, 16 appear in front of the motor vehicle 1. The further object 16 impedes a collision-free emergency evasive maneuver. Meaning, a collision becomes unavoidable earlier than in the scenario variant before. But even in this case, the motor vehicle 1 still has the option to reduce the collision severity to ensure maximum safety.

While the further object 6 can legally drive on the adjacent lane, the object 6 disregards the right of way and drives out behind the obscuring parked cars, for example. In addition, these parked cars make a collision maneuver to the right difficult.

Various metrics can be defined to quantify the degree of accident severity 11 of crash consequences. The parameters vary depending on the field of research and the specific area of interest. In general, an accident exists when unintended forces are applied to the vehicle body, resulting in adverse health effects or damage. In addition, a variety of influences act on the crash outcome, making it difficult to objectively quantify the accident severity 11, especially with few individual values. For example, the same technical accident sequence can lead to completely different short-term effects for vital and non-vital traffic participants, with even more uncertain long-term effects. Therefore, the range of accident severity is divided into four groups below, A first group constitutes vehicle and occupant loading, a second group the technical severity, a third group the injury severity, and a fourth group the long-term effects.

Based on advantages and disadvantages, the particular application and requirements determine the appropriate severity level metric. In addition, the availability of data leads to necessary approximations.

The technical accident severity 11 quantifies the mechanical vehicle loading due to force that result in acceleration a(t), velocity v(t) and deformation s(t) over time.

The technical accident severity 11 depends, among other things, on the type of collision objects (masses, shapes, compatibility, etc.), the speed and the impact position. Characteristic values of kinematics are used to indicate the severity by means of single values. The key here is, where and how the data is obtained. While FEM simulations, crash tests, and event recorders provide detailed information about the crash history (e.g., a(t), v(t), and s(t)), police and accident investigators record the incident retrospectively by finding the vehicle only in the rest position. Nevertheless, various accident severity level metrics have been established over the years. For example, the deformation energy ΔT is obtained by reconstructing the force by way of the intrusion. Since the intrusion is measured after the impact, it only indicates the plastic energy exchange. The Energy Equivalent Speed (EES) relates the deformation energy ΔT as kinetic energy to the vehicle mass m: $\Delta T = 0.5 \, m EES^2$. The reconstruction of the accident includes the determination of the velocities at impact, denoted vrel, as well as the velocity change during the crash Δv.

With respect to the vehicle itself, the external force loads the vehicle body and thus indirectly the occupants. Consequently, the crash impulse a(t) and the intrusion s(t) are the main causes of injuries. To mitigate the damage, energy is extracted from the passenger compartment by means of vehicle deformation.

In addition, the restraint systems are designed to distribute the load on the occupants over the crash time according to the human load limits. Nevertheless, strong impacts can still act on the individual occupants. These are measured, for example, by the Head Injury Criterion (HIC) or Neck Injury Criterion (NIC), which indicate the acceleration of the respective body region over a certain time interval. The same is true for other traffic participants, such as Vulnerable Road Users (VRU). The only difference is probably the lack of appropriate impact protection.

Injury severity depends on occupant-related characteristics, such as vitality, height, or gender, and occupant position in the vehicle, in addition to force and restraint system. The Abbreviated Injury Scale (AIS) is a commonly used metric in accident research to indicate and compare the medical severity level.

The AIS assesses the lethality of individual injuries. The Maximum AIS (MAIS) represents these individual injuries of body regions or the entire person by their maximum value. Alternatively, the Injury Severity Score (ISS) aggregates the most severe traumas of three body regions quadratically.

In addition, long-term effects can be expressed in monetary values, such as vehicle damage and medical costs, or in human-related characteristics, such as convalescence, survival probability, or lethality rate.

In summary, based on this overview, there is no all-in-one solution to express the damage of a collision. Rather, the application must determine the appropriate severity level metric. Due to automated driving with human traffic participants, the goal in the aforementioned embodiments is to protect traffic participants based on ethical guidelines. Therefore, injury severity has been considered as a metric. However, injury severity level is highly individual, which makes objective crash assessment difficult, and is very difficult, if not impossible, to predict with sufficient accuracy in real time. Furthermore, the selected application example in this embodiment is based on the impact of the vehicle structure. It does not necessarily require injury severity and can be expressed by vehicle crash dynamics. Therefore, in these embodiments, the technical accident severity 11 is chosen to represent the accident damage. Advantageous for the presented method is selecting the technical accident severity 11 through Δv.

Even in the case of a head-on accident, for example, several parameters can be used to indicate severity. Furthermore, the individual vehicle dynamics a(t), v(t) and s(t) are convertible or redundant, respectively, so that it seems reasonable to reduce considerations. The restraint systems are mainly dependent on deceleration and speed. Deformation does not give any information about stopping behavior and possible multiple collisions.

Furthermore, the acceleration signals will be noisy in most cases when measured, for example, by an event recorder or in FEM simulations. Additionally, it must be mentioned that a single value is a rough approximation and in this case neglects important temporal features, such as maximum or average deceleration On the other hand, the value $\Delta v$ has a long tradition in depth surveys and it has a strong correlation with injury probabilities. The probability of a given MAIS level is related to the recorded $\Delta v$ value by logistic regression.

NOMENCLATURE LIST AND SYMBOL LIST

The nomenclature and symbol list below is written in English, since it is the primarily used language in the field of autonomous driving and to stay consisted with the corresponding abbreviations used. It is added for the sake of completeness and serves, in particular, for interpreting and understanding the formulas used in the description. Any abbreviations that are not written out in full and/or formula symbols that are not explained can therefore be taken from the list below. From the following abbreviations and symbol usages, the person skilled in the art can obtain the corresponding notes on calculating the individual formulas or on the corresponding interrelationships.

GDP Gross domestic product
SAE Society of Automotive Engineers
EgoOwn (ego) vehicle
TTC Time-To-Collision
NCAP New Car Assessment Programme
AIS Abbreviated Injury Scale
MAIS Maximal Abbreviated Injury Scale
GIDAS German In-Depth Accident Study
GPU Graphics Processing Unit
FRG Federal Republic of Germany
ADAS Advanced Driver Assistance Systems
IIHS Institute for Highway Safety
ABS Anti-lock Braking System
ESC Electronic Stability Control
AACN Advanced Automatic Crash Notification
eCall Emergency call E911
TPS Third Party Services
MKB Multi collision brake
ATMS Advanced Traffic Management Systems
DMS Dynamic Message Sign
HMI Human Machine Interface
FE(M) Finit Element (Method)
NASS-CDS National Automotive Sampling System-Crashworthiness Data System
ICS Inevitable collision state
TM Tunnel Middle
TTX Time to x
TTR Time to react
TTB Time to brake
TTS Time to steer
CA Collision avoidance
CM Collision mitigation
ASIL Automotive Safety Integrity Level
TTCCP Time-to-critical-collision-probability
OEM Original Equipment Manufacturer
MPC Model Predictive Control
RK3 Runge-Kutta integrator third order
AEB Automatic Emergency Braking
VRU Vulnerable Road User
MDP Markov Decision Process
PDF Probability density function
DOF Degree of freedom
CDF Cumulative density function
PCA Principal Component Analysis
COG Center of Gravity
SUV Sports utility vehicle
MSE Mean squared error
TP/FP True/false positives
TN/FN True/false negatives
FFNN Feed forward neuronal network
RF Random forest
CIM Centric impact model
EIM Eccentric impact model Kelvin model. Two masses are connect by a parallel spring and damper
NOC Number of Conflicts
CV Constant velocity
CTR Constant turn rate
LHS Latin hypercube sampling
FS Functional scenario
FES Functional evaluation scenario
LS Logical scenario
CS Concrete scenario
GA Genetic algorithm
GPSA Generalized Pattern Search Algorithm
UTYPGIDAS accident type
HIL Hardware-in-the-loop
INS Inertial Navigation System
GNSS Global Navigation Satellite System
PCM Pre-Crash-Matrix
V2I Vehicle-to-infrastructure
LPTB Last point to brake
LPTS Last point to steer
SIL Software in the loop
($\bullet$) Placeholder for a variable
n arbitrary counter
N Absolute number of a finite set
$a_{b,c}$ Notation means: variable a with the properties b AND c (e.g. ego velocity in longitudinal direction: $v_{E,long}$)
$a_{bc}$ Notation means: variable a with the property b AND variable a with the property c (e.g., velocity v for the ego vehicle E and velocity for the target vehicle K: $v_{E/K}$)
a|b Event a under the condition b (e.g., accident severity under the condition of collision: |coil)
A bold, capital letter indicates a matrix, or vector of random variables
A, a bold symbol indicates a vector or matrix
P(e) Probability of event
e($\bullet$)(t) Time variant value (e.g., a(t), v(t), s(t))
($\bullet$)$_{long}$ Value in longitudinal direction (e.g., $a_{long}$)
($\bullet$)$_{lat}$ Value in lateral direction (e.g., $a_{lat}$)
$p_Z^{(Z)}$ Probability density function to the random variable Z sample
($\bullet$)$_E$, ($\bullet$)$_K$, ($\bullet$)$_{EK}$ The bidirectional relation between ego vehicle E and one target object K is emphasized by the identifiers E/K/EK
$Z \sim \mathcal{N}(\mu, \sigma)$ The random variable Z is normal distributed with the expected value $\mu$ and standard derivation
$Z \sim \mathcal{N}(\mu, \Sigma)$ The random vector Z is normal distributed with the expected value vector $\mu$ and covariance matrix $\Sigma$
$z: \Omega \rightarrow \mathbb{R}$ The random variable z maps the sample space $\Omega$ to a scalar value of a real number $\mathbb{R}$ Real numbers
E($\bullet$) Expected value (•)* Optimal value
(•)$_n$, (•)$_t$ Normal and tangential direction
(•)$_f$, (•)$_r$ Front and rear axle of the non-linear single track model
(•) and (•)' Before and afterwards
Δ(•) Relative values (e.g., relative pose such as Δx, Δy, and Δφ)
(̂•), (•̂) Estimated value (̂•) in relation to the reference value (•)
f(•) Function in general;
t time
$t_0$ Time at the moment 0 (begin of a sequence);
$t_p$, $t_i$, $t_m$ Different time t discretization levels ($t_p$: between states s, $t_i$: reward generation, $t_m$: integration steps dynamic model)
i Index of time step $t_i$ for the reward generation
$t_i$(s, a, s') of the MDP
F Force
a Acceleration;
$a_{in}$ Input acceleration and deceleration due to the engine and brake, respectively, according to the motion planning
v Velocity
$v_{rel}$ Relative velocity
$v_{ego}$, $v_E$ Velocity of ego vehicle
$v_{target}$, $v_K$ Velocity of target vehicle sDisplacement;
$E_{kin}$ Kinetic energy
p Momentum;
ΔT Deformation energy
s Displacement on a trajectory; State in the MDP s∈$\mathcal{S}$; empirical standard derivation
{$\mathcal{S}$, $\mathcal{A}$, $\mathcal{T}$, $\mathcal{R}$} 5-tupel which defines the Markov Decision Process (MDP) with the set of states $\mathcal{S}$, the set of actions $\mathcal{A}$, the set of transitions $\mathcal{T}$, set of rewards $\mathcal{R}$ e, and discount factor γ
$\mathcal{A}_s$ Set of available actions a in state s action s' Future state in the MDP s'∈$\mathcal{S}$ with reference to state s
T(s, a, s') Transition in the MDP between the state s and s' according to the action a
Re(s, a, s') Reward in the MDP between the state s and s' according to the action a
f(s, a, s') Feature in the MDP which is derived between the state s and s' according to the action a
θ Weight of the reward function
π Policy (sample of Π)
π* Optimal policy
$π^s$ Selected policy
Π Set of possible policies
$Δt_{E,dyn}$ Step size to integrate the dynamic model
$τ_{E,dyn}$ ($Δt_{E,dyn}$=$t_{m+1}$−$t_m$) V(s)Value in the MDP of the state s
TH Time horizon of the planning process
Ψ∈ψ Accident severity as part of risk
R (criticality feature)
$R_f$ Risk (criticality feature)—in general terms and as feature in the motion planning (partly aggregated)
Δv velocity change during crash/technical accident severity
P(C) Collision probability
$Ψ_{impact}$ Severity in the moment of impact
$R_{thr}$ Risk threshold for the graceful degradation
M Environment model
η Accident severity prediction function
ω Label for the instantaneous vehicle object (collision) configuration (ω:=$z_{EK}$); Yaw rate $ω_{coll}$, $ω_{\overline{coll}}$ Instantaneous vehicle object configuration which is in collision or not in collision
$ω_{coll}^{Pmax}$ Most probable collision configuration
Ω Sample space; Random variable to the yaw rate
ω$Ω^{dyn}$ Sample space of dynamic elements
$Ω^{stat}$ Sample space of static elements
$Ω^{voc}$ Sample space of vehicle object constellations
τ Dynamic model (e.g., $τ_{E,dyn}$ represents the ego vehicle dynamic with a non-linear single track model)
x Position in x direction
y Position in y direction
φ Orientation
$o_k$∈$\mathcal{O}$ The sample target vehicles $o_k$ are summarized by the set $\mathcal{O}$ $h_k^j$∈$\mathcal{H}_k$ The sample intentions $h_k^j$ of target vehicle $o_k$ are summarized by the set $\mathcal{H}_k$ of the target vehicle
EK Bidirectional event between ego vehicle E and one target object
$o_{k=K}$. It relates to the substate $z_{EK}$ of one time step $t_i$ of object $o_k$ with intention $h_j$ and thus is equal to EK $\triangleq$ $EK_{i,k}^j$
C Event collision
z∈Z State vector as sample vector and random vector (e.g., $z_E$∈$Z_E$, $z_K$∈$Z_K$)
$x_c$∈$X_c$ Object classification as sample and random variable
$z_{EK}$∈$Z_{EK}$ State vector of bidirectional substate between ego E and one target object K as sample vector and random vector with
EK$\triangleq$$EK_{i,k}^j z_{dyn}$∈$Z_{dyn}$ State vector with dynamic, time variant elements of z as sample vector and random vector
$z_{stat}$∈$Z_{stat}$ State vector with static, time invariant elements of z as sample vector and random vector
g∈G State vector with geometric elements of z as sample vector and random vector
$\tilde{g}$∈$\tilde{G}$ Reduced state vector with geometric elements of z as sample vector and random vector
p∈P Reduced state vector excluding geometric elements of z as sample vector and random vector
$z_{input}$∈$Z_{input}$ Reduced state vector with directly and indirectly measureable elements of z as sample vector and random vector
$Z_{train}$∈$Z_{train}$ Reduced state vector with non-measureable elements of z as sample vector and random vector
$f_{crit}$(s, a, s') Feature for the criticality estimation
$f_{comfort}$(s, a, s') Feature for the comfort estimation
$f_{progress}$(s, a, s') Feature for the progress estimation
$ψ_{Pmax}$ Accident severity at the most probable collision configuration $ω_{coll}^{Pmax}$
D, D' etc. Minkowski Difference. The apostrophe indicates a transformed Minkowski Difference.
δ Confidence interval for the angle probability; Steering angle
Λ Matrix of eigenvalues
V Matrix of eigenvectors
α Rotation angle of eigenvectors; Angle to COG line; Accuracy function α(•); Slip angle
Σ Covariance matrix
l Length of a vehicle
w Width of a vehicle
e Restitution coefficient
M Mass matrix of multi-body system mMass; Index of time step $t_m$ for the integration of a dynamic model
C Damper matrix of multi-body system cDamper coefficient of a damper K Stiffness matrix of multi-body system
k Stiffness of a spring, Index of objects $o_k$
ξ Additional static feature
J Moment of inertia;
$f_{model}$ Established models (e.g., dynamic model τ) to map direct measurable parameters
ϑ Correlation coefficient
q Weighting factor between self and target protection
S Momentum (impact drive)
B Impact point
μ Friction; Expected value
r Distance vector
$r_F$ Distance vector to force insertion
e Error (defined as difference between the estimated and reference value such as e=(•̂)−(•); Restitution coefficient
α Rotation angle of eigenvectors; angle to COG line; accuracy function α(•)
φ(•) Relevance function
F1-score harmonic mean (e.g., between precision and recall)
g(t) Execution time value
T-score harmonic mean (e.g., between F1-score and g(t))
σ Standard derivation; Mechanical load
∈ Deformation/displacement
$z_{cm}$ State to the crash motion model $\tau_{cm}$
λ Eigenvalue; Constraint; Progress on trajectory (e.g., $\lambda_{ego}$)
$k_{air}$ Constant of the flow resistance
$k_e$ Engine proportion relating to front and rear axle
d Distance (e.g. distance between current position of the vehicle and the centerline
$d_{lat}$, distance to potential collision objects at the moment of appearance $d_{appear}$
$f_{update}$ Update frequency of the planning process

REFERENCE SIGN LIST

1 Motor vehicle
2 Assistance system
3 Environment detection device
4 Electronic computing device
5 Environment
6 Object
7 Uncertainty
8 Trajectory
8a Evasive maneuver
8b Collision maneuver
8c Mitigation maneuver
9 Collision probability
10 Most probable impact constellation
11 Accident severity
12 Weight
13 Past position
14 Longitudinal acceleration device
15 Lateral acceleration device
16 Further object
S1 First step
S2 Second step
S3 Third step
S4 Fourth step
S5 Fifth step
S6 Sixth step
R Risk Value

The invention claimed is:

1. A method for determining a trajectory of an at least partially assisted-operated motor vehicle via an assistance system of the motor vehicle, comprising:
   detecting, via an environment detection device, at least one object in an environment of the motor vehicle;
   determining, via an electronic computing device, at least one uncertainty parameter with respect to the detected object, the at least one uncertainty parameter being dynamically updated based on sensor data;
   predicting, via the electronic computing device, a future environment of the object as a function of the detected environment and the detected object, wherein the prediction utilizes a computational model that dynamically updates based on detected object movement and environmental changes to provide real-time performance;
   determining, via the electronic computing device,
      a risk value for a planned trajectory on the basis of
      (i) a collision probability,
      (ii) a most probable impact constellation characterizing spatial and dynamic relationships between the motor vehicle and the detected object, and
      (iii) an accident severity for the most probable impact constellation,
   wherein the collision probability and the accident severity are weighted within the risk value using an adaptive algorithm that dynamically adjusts weightings based on detected object behavior and vehicle state, and
   determining the planned trajectory as a function of the determined risk value, wherein the determining of the planned trajectory comprises applying a control algorithm to adapt the vehicle's longitudinal and/or lateral acceleration in real-time to perform collision avoidance or mitigation maneuver.

2. The method according to claim 1, wherein the environment detection device comprises one or more sensors configured to detect object presence, object distance, object velocity, or visual characteristics of the environment.

3. The method according to claim 1, wherein the electronic computing device is configured to perform a continuous optimization of the planned trajectory by iteratively readjusting the planned trajectory based on updated environment data.

4. The method according to claim 1, wherein the at least one uncertainty parameter comprises one or more of:
   a position uncertainty of the object,
   a position uncertainty of the motor vehicle,
   a pose uncertainty of the object,
   a pose uncertainty of the motor vehicle,
   a parameter uncertainty of the object, and/or
   a parameter uncertainty of the motor vehicle.

5. The method according to claim 1, wherein the control algorithm for adapting the vehicle's longitudinal and/or lateral acceleration is configured to prioritize collision avoidance over collision mitigation when both options are viable.

6. The method according to claim 1, wherein determining the risk value comprises incorporating a weight adjustment mechanism that dynamically modifies the weight of collision probability and accident severity based on detected speed and direction changes of the detected object.

7. The method according to claim 1, wherein determining the most probable impact constellation comprises processing a Minkowski difference and a linear transformation.

8. The method according to claim 1, further comprising processing a distribution of the accident severity during the determining of the risk value.

9. An assistance system for an at least partially assisted-operated motor vehicle for determining a trajectory, comprising:
- an environment detection device, for detecting at least one object in an environment of the motor vehicle; and
- an electronic computing device, for determining at least one uncertainty parameter with respect to the detected object, the at least one uncertainty parameter being dynamically updated based on sensor data;
- wherein the electronic computing device is configured to predict a future environment of the object as a function of the detected environment and the detected object, wherein the prediction utilizes a computational model that dynamically updates based on detected object movement and environmental changes to provide real-time performance,
- and wherein the electronic computing device is configured to
  - determine a risk value for a planned trajectory on the basis of (i) a collision probability, (ii) a most probable impact constellation characterizing spatial and dynamic relationships between the motor vehicle and the detected object, and (iii) an accident severity for the most probable impact constellation, wherein the collision probability and the accident severity are weighted within the risk value using an adaptive algorithm that dynamically adjusts weightings based on detected object behavior and vehicle state, and
  - determine the planned trajectory as a function of the determined risk value, wherein the determining of the planned trajectory comprises applying a control algorithm to adapt the vehicle's longitudinal and/or lateral acceleration in real-time to perform collision avoidance or mitigation maneuver.

10. The assistance system according to claim 9, wherein the environment detection device comprises one or more sensors configured to detect object presence, object distance, object velocity, or visual characteristics of the environment.

11. The assistance system according to claim 9, wherein the electronic computing device is configured to perform a continuous optimization of the planned trajectory by iteratively readjusting the planned trajectory based on updated environment data.

12. The assistance system according to claim 9, wherein the at least one uncertainty parameter comprises one or more of:
- a position uncertainty of the object,
- a position uncertainty of the motor vehicle,
- a pose uncertainty of the object,
- a pose uncertainty of the motor vehicle,
- a parameter uncertainty of the object, and/or
- a parameter uncertainty of the motor vehicle.

13. The assistance system according to claim 9, wherein the control algorithm for adapting the vehicle's longitudinal and/or lateral acceleration is configured to prioritize collision avoidance over collision mitigation when both options are viable.

14. The assistance system according to claim 9, wherein determining the risk value comprises incorporating a weight adjustment mechanism that dynamically modifies the weight of collision probability and accident severity based on detected speed and direction changes of the detected object.

15. The assistance system according to claim 9, wherein determining the most probable impact constellation comprises processing a Minkowski difference and a linear transformation.

16. The assistance system according to claim 9, further comprising processing a distribution of the accident severity during the determining of the risk value.

17. A computer program product comprising a non-transitory computer-readable medium storing instructions, which, when executed by a processor, causes an assistance system for a motor vehicle to:
- detect, via an environment detection device, at least one object in an environment of the motor vehicle;
- determine at least one uncertainty parameter with respect to the detected object, the at least one uncertainty parameter being dynamically updated based on sensor data;
- predict a future environment of the object as a function of the detected environment and the detected object, wherein the prediction utilizes a computational model that dynamically updates based on detected object movement and environmental changes to provide real-time performance;
- determine a risk value for a planned trajectory on the basis of (i) a collision probability (ii) a most probable impact constellation characterizing spatial and dynamic relationships between the motor vehicle and the detected object, and (iii) an accident severity for the most probable impact constellation, wherein the collision probability and the accident severity are weighted within the risk value using an adaptive algorithm that dynamically adjusts weightings based on detected object behavior and vehicle state; and
- determine the planned trajectory as a function of the determined risk value, wherein the determining of the planned trajectory comprises applying a control algorithm to adapt the vehicle's longitudinal and/or lateral acceleration in real-time to perform collision avoidance or mitigation maneuver.

18. The computer program product according to claim 17, wherein the environment detection device comprises one or more sensors configured to detect object presence, object distance, object velocity, or visual characteristics of the environment.

19. The computer program product according to claim 17, wherein the at least one uncertainty parameter comprises one or more of:
- a position uncertainty of the object,
- a position uncertainty of the motor vehicle,
- a pose uncertainty of the object,
- a pose uncertainty of the motor vehicle,
- a parameter uncertainty of the object, and/or
- a parameter uncertainty of the motor vehicle.

20. The computer program product according to claim 17, wherein the non-transitory program code, which, when executed, determines the most probable impact constellation by processing a Minkowski difference and a linear transformation.

* * * * *